| United States Patent [19] | [11] | 4,029,610 |
|---|---|---|
| Narayan et al. | [45] * | June 14, 1977 |

[54] CARBODIIMIDE-ISOCYANURATE FOAMS CONTAINING URETHANE LINKAGES

[75] Inventors: Thirumurti L. Narayan, Riverview; Moses Cenker, Trenton, both of Mich.

[73] Assignee: BASF Wyandotte Corporation, Wyandotte, Mich.

[ * ] Notice: The portion of the term of this patent subsequent to June 3, 1992, has been disclaimed.

[22] Filed: Apr. 9, 1975

[21] Appl. No.: 566,249

Related U.S. Application Data

[62] Division of Ser. No. 472,587, May 23, 1974, Pat. No. 3,922,238.

[52] U.S. Cl. .................. 260/2.5 BF; 260/2.5 AC; 260/2.5 AM; 260/2.5 AW
[51] Int. Cl.² ................ C08G 18/18; C08G 18/30; C08G 18/48
[58] Field of Search ............... 260/2.5 BF, 2.5 AC, 260/2.5 AM, 2.5 AW, 2.5 AB

[56] References Cited

UNITED STATES PATENTS

| 3,645,923 | 2/1972 | Kan | 260/2.5 AW |
|---|---|---|---|
| 3,657,161 | 4/1972 | Bernard et al. | 260/2.5 AW |
| 3,676,380 | 7/1972 | McLaughlin et al. | 260/2.5 AW |
| 3,717,596 | 2/1973 | Kan | 260/2.5 BF |
| 3,723,364 | 3/1973 | McLaughlin et al. | 260/2.5 AW |
| 3,723,366 | 3/1973 | Kan | 260/2.5 AW |
| 3,887,501 | 6/1975 | Narayan et al. | 260/2.5 AW |
| 3,922,238 | 11/1975 | Narayan et al. | 260/2.5 AM |

FOREIGN PATENTS OR APPLICATIONS

| 908,337 | 10/1962 | United Kingdom | 260/2.5 AW |
|---|---|---|---|

*Primary Examiner*—Donald E. Czaja
*Assistant Examiner*—H. H. Fletcher
*Attorney, Agent, or Firm*—Joseph D. Michaels; Bernhard R. Swick; Robert E. Dunn

[57] ABSTRACT

Cellular foam compositions are prepared by catalytically condensing an organic polyisocyanate in the presence of a blowing agent, from 0.01 to 0.5 equivalent per equivalent of isocyanate of a primary hydroxy-terminated polyoxyalkylene or polyester polyol and a catalyst system comprising (a) methanol, (b) a tertiary amine trimerization catalyst, and (c) a urethane catalyst. The resulting foam compositions are characterized by carbodiimide, isocyanurate and urethane linkages and exhibit unexpectedly low friability, improved strength properties, and good flame retardancy.

7 Claims, No Drawings

CARBODIIMIDE-ISOCYANURATE FOAMS CONTAINING URETHANE LINKAGES

The present application is a division of application Ser. No. 472,587 filed May 23, 1974, now U.S. Pat. No. 3,922,238.

BACKGROUND OF THE INVENTION

1. Field Of The Invention

The present invention relates to cellular foam compositions characterized by low friability, improved strength properties and good flame retardancy. More particularly, the invention relates to carbodiimide-isocyanurate foams containing urethane linkages prepared by condensing an organic polyisocyante and a primary hydroxy-terminated polyoxyalkylene or polyester polyol in the presence of certain catalyst systems.

2. The Prior Art

In our copending U.S. patent applications Ser. Nos. 427,035 and 427,122, both filed Dec. 21, 1973, now U.S. Pat. Nos. 3,894,972 and 3,887,501, respectively, we disclose the preparation of foam compositions characterized by carbodiimide and isocyanurate linkages by condensing an organic polyisocyanate in the presence of a catalyst system comprising (a) furfuryl alcohol or methanol and (b) a tertiary amine trimerization catalyst. Also disclosed therein is that the foam compositions may be modified to contain urethane linkages by carrying out the condensation in the presence of a polyol and a urethane catalyst. The present invention is an improvement in the process and compositions described in our aforementioned applications.

SUMMARY OF THE INVENTION

The present invention relates to an improved process for the preparation of carbodiimide-isocyanurate foams containing urethane linkages which comprises condensing an organic polyisocyanate in the presence of a blowing agent, a primary hydroxy-terminated polyoxyalkylene or polyester polyol employing a catalyst system comprising (a) methanol, (b) a tertiary amine trimerization catalyst, and (c) a urethane catalyst. Upon mixing a polyisocyanate a polyol and the catalysts in accordance with the present invention, three reactions are competitive, namely, carbodiimide formation, isocyanurate formation and urethane formation. It is the use of the primary hydroxy-terminated polyols which achieves the balance of reactivity to provide foams having low friability and improved physical strength.

DESCRIPTION OF THE PREFERRED EMBODIMENTS

The crux of the present invention resides in the use of certain primary hydroxy-terminated polyoxyalkylene or polyester polyols in the condensation of organic polyisocyanates in the presence of a catalytically sufficient amount of a catalyst system comprising (a) methanol, (b) a tertiary amine trimerization catalyst, and (c) a urethane catalyst. The use of these polyols results in foams having improved friability and strength properties without any significant reduction in flame retardancy.

The primary hydroxy-terminated polyoxyalkylene or polyester polyols which may be employed in the process of the subject invention have an average functionality of from two to eight and an average equivalent weight of from about 150 to 1500. These polyols may be prepared by the reaction of ethylene oxide with an organic compound having at least two active hydrogen-containing groups such as water, an aliphatic alcohol having from two to eight hydroxyl groups, an aliphatic or aromatic polyamine having from one to four amino groups or mono- or polynuclear polyhydric phenols. They may also be prepared by capping with ethylene oxide, the propylene oxide or mixed propylene oxide/ethylene oxide adducts of any of the above organic compounds. Thus, the polyols of use in the invention include polyoxyethylene polyols prepared by the addition of ethylene oxide to compounds such as water, ethylene glycol, diethylene glycol, glycerol, trimethylolpropane, 1,2,6-hexanetriol, pentaerythritol, sorbitol, sucrose, alkyl glucoside, catechol, resorcinol, hydroquinone, 2,2-bis(4-hydroxyphenyl)propane, bis(p-hydroxyphenyl) methane, toluene diamine, ethylene diamine and methylene dianiline, and polyoxyalkylene polyols prepared by reaction of propylene oxide or a mixture of propylene oxide and ethylene oxide with any of the above-mentioned compounds followed by capping with ethylene oxide to achieve primary hydroxy-termination. The polyester polyols which may be employed in the present invention are prepared from dibasic carboxylic acids and primary hydroxy-terminated polyhydric alcohols.

As mentioned above, there are three components of the catalyst system employed in the present invention, namely, (a) methanol, (b) a tertiary amine trimerization catalyst, and (c) a urethane catalyst. It is the methanol in conjunction with the trimerization catalyst which promotes the formation of the carbodiimide linkages. The amount of methanol employed is generally from 0.1 part to 10 parts per 100 parts of organic polyisocyanate.

Tertiary amine trimerization catalysts which are employed in the present invention include 1,3,5-tris-(N,N-dialkylaminoalkyl)-s-hexahydrotriazindes; the alkylene oxide and water adducts of 1,3,5-tris(N,N-dialkylaminoalkyl)-s-hexahydrotriazines; 2,4,6-tris(dimethylaminomethyl)phenol; o-, p- or a mixture of o- and p-dimethylaminomethylphenol and triethylene diamine or the alkylene oxide and water adducts thereof. These compounds are well known in the art, as is their use as catalysts which promote isocyanurate linkages.

1,3,5-Tris(N,N-dialkylaminoalkyl)-s-hexahydrotriazine compounds have heretofore been described as useful co-catalysts or isocyanate trimerization catalysts. See U.S. Pat. No. 3,723,366, the disclosure of which is hereby incorporated by reference. Preferred within this group of hexahydrotriazine compounds is 1,3,5-tris(N,N-dimethylaminopropyl)-s-hexahydrotriazine.

The alkylene oxide and water adducts of a 1,3,5-tris(N,N-dialkylaminoalkyl)-s-hexahydrotriazine are presumably a quaternary ammonium hydroxide. These compounds are generally prepared by reacting equimolar amounts of the hexahydrotriazine, alkylene oxide and water at a temperature of from about 10° to 80° C. for a period of from about five minutes to two hours. Preferred within this group of compounds is the propylene oxide and water adduct of 1,3,5-tris(N,N-dimethylaminopropyl)-s-hexahydrotriazine. See U.S. Pat. Nos. 3,746,709 and 3,766,103, the disclosures of which are hereby incorporated by reference.

2,4,6-Tris(dimethylaminoethyl)phenol as well as o-, p- and a mixture of o- and p-(dimethylaminomethyl)- phenol are known compounds which are commercially available products sold by Rohm & Haas under the trade names DMP-30 and DMP-10. Triethylenediamine and the alkylene oxide and water adducts thereof are also well-known compounds.

The amount of trimerization catalyst which may be employed in the present invention is generally from 0.1 part to 20 parts of catalyst per 100 parts of organic polyisocyanate.

Urethane catalysts which are employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalyst is dibutyltin diacetate. Generally, the amount of the urethane-promoting catalyst employed will be from 0.01 part to 10 parts per 100 parts of organic polyisocyanate.

The organic polyisocyanate used in the preparation of the foams in accordance with the present invention corresponds to the formula:

R"(NCO)$_z$ wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4', 4'''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers". These quasi-prepolymers are prepared by reacting an excess of organic polyisocyanate or mixtures thereof with a minor amount of an active hydrogen containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxy-terminated polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α, β-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and in U.S. patent application Ser. No. 311,809 filed Dec. 4, 1972, now U.S. Pat. No. 3,823,201 the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541, and 3,639,542. As is clear from the above, the particular polyol ingredient employed in the preparation of the quasiprepolymer is not a critical aspect of the present invention. Any compound containing at least two reactive hydrogen atoms may be so used.

The blowing agents which are employed in the present invention are well known in the art. Representative blowing agents include water, fluorocarbons such as tetrafluoromethane, bromotrifluoromethane, chlorotrifluoromethane, dibromodifluoromethane, dichlorodifluoromethane, trichlorofluoro-methane, hexafluoroethane, 1,2,2-trichloro-1,1,2-trifluoroethane, 1,1,2,2-tetrachloro-1,2-difluoroethane, 1,2-dibromo-1,1,2,2-tetrafluoroethane, 1,2,2-tribromo-1,1,2-trifluoroethane, octafluoropropane, decafluorobutane, hexafluorocyclopropane, 1,2,3-trichloro1,2,3-trifluorocyclopropane, octafluorocyclo-butane-1,1,2-dichloro-1,2,3,3,4,4-hexafluorocyclobutane, 1,2,3,4-tetrachloro-1,2,3,4-tetrafluorocyclobutane, trichloroethylene, chloroform, carbon tetrachloride, and low boiling hydrocarbons, such as butane, pentane, and hexane.

The foams of the present invention are prepared by mixing together the organic polyisocyanate, the polyol, the catalyst and the blowing agent at an initiating temperature which, depending on the catalysts, will range from about 0° to 150° C. Alternatively, the foams may be prepared by adding the catalyst to the polyisocyanate and the polyol and, when necessary, heating the mixture to the initiation temperature or separately pre-heating the polyisocyanate, the polyol and the catalyst, and then mixing the ingredients.

The present invention also contemplates the incorporation of additional ingredients in the foam formulation to tailor the properties thereof. Thus, plasticizers, such as tris(2-chloroethyl) phosphate; surfactants, such as the silicone surfactants, e.g., alkylpolysiloxanes and polyalkyl siloxanes, may be employed in the invention. Also, inorganic fillers, pigments, and the like can be used.

In any event, the carbodiimide-isocyanurate foams prepared in accordance herewith are rigid cellular products having a density of from about 1 pound to 40 pounds per cubic foot which exhibit excellent flame properties, such as fire resistance, low smoke evolution and excellent weight retention.

Following are specific, non-limiting examples which are provided to illustrate the enumerated principles described herein. All parts are by weight unless otherwise indicated. In the examples, the compressive strength properties of the foams were determined in accordance with ASTM-1621, the flame retardant properties by ASTM D-3014, and the friability properties by ASTM C-421.

EXAMPLES 1–36

A series of foams was prepared by mixing at room temperature two streams and allowing the mixture to foam in a one-gallon paper cup. Generally, the mixture foamed in about two to ten seconds and was tack-free in 40–80 seconds. One stream contained the polyisocyanate and blowing agent while the other stream contained the catalysts, surfactant, polyol and various optional ingredients. Infrared spectroscopic analyses reveal that all the foams exhibit carbodiimide, isocyanurate and urethane linkages. Details of the preparations as well as physical properties of the resulting foams are presented in Tables I and II, below.

In the tables which follow, the following abbreviations are employed:

PAPI — polymethylene polyphenylisocyanate
TDI — a mixture of 80% 2,4-toluenediisocyanate and 20% 2,6-toluenediisocyanate
FA — furfuryl alcohol
MA — methanol
TDH — 1,3,5-tris(N,N-dimethylaminopropyl)-s-hexahydrotriazine
DBTDA — dibutyltin diacetate FYROL CEF
— tris(2-chloroethyl)phosphate
DC-193 — silicone surfactant product by Dow Corning Corp.
F-11B — fluorotrichloromethane Polyol A — ethylene oxide adduct of trimethylolpropane having an equivalent weight of 242
Polyol B — ethylene oxide capped propylene oxide adduct of trimethylolpropane having an equivalent weight of 535 and an ethylene oxide content of 65% by weight
Polyol C — ethylene oxide capped propylene oxide adduct of trimethylolpropane having an equivalent weight of 1516 and an ethylene oxide content of approximately 21% by weight
Polyol D — ethylene oxide capped propylene oxide adduct of glycerine having a equivalent weight of 1580 and an ethylene oxide content of approximately 21% by weight
Polyol E — ethylene oxide adduct of glycerine having an equivalent weight of 241
Polyol F — ethylene oxide capped propylene oxide adduct of sucrose having an equivalent weight of 491 and an ethylene oxide content of approximately 67% by weight
Polyol G — ethylene oxide adduct of 2,2-bis(4-hydroxyphenyl)propane having an equivalent weight of 250

Table I

| Example | TDI | PAPI | Polyol | FA | MA | DBTDA | TDH | FYROL CEF | DC-193 | F-11B |
|---|---|---|---|---|---|---|---|---|---|---|
| 1 | — | 300 | A 45 | 9 | — | 3 | 6 | 4.5 | 3 | 55 |
| 2 | — | 300 | A 60 | 9 | — | 3 | 6 | 4.5 | 3 | 55 |
| 3 | — | 300 | A 75 | 9 | — | 3 | 6 | 4.5 | 3 | 55 |
| 4 | — | 300 | B 60 | 9 | — | 3 | 4.5 | 4.5 | 3 | 60 |
| 5 | — | 300 | B 66 | 9 | — | 3 | 4.5 | 4.5 | 3 | 60 |
| 6 | — | 300 | B 75 | 9 | — | 3 | 4.5 | 4.5 | 3 | 60 |
| 7 | 30 | 270 | B 60 | 9 | — | 3 | 4.5 | 4.5 | 3 | 55 |
| 8 | 30 | 270 | B 66 | 9 | — | 3 | 4.5 | 4.5 | 3 | 55 |
| 9 | 30 | 270 | B 75 | 9 | — | 3 | 4.5 | 4.5 | 3 | 55 |
| 10 | — | 300 | C 60 | — | 6 | 3 | 6 | 4.5 | 3 | 55 |
| 11 | — | 300 | C 75 | — | 6 | 3 | 6 | 4.5 | 3 | 55 |
| 12 | — | 300 | C 90 | — | 6 | 3 | 6 | 4.5 | 3 | 55 |
| 13 | — | 300 | C 60 | 9 | — | 3 | 6 | 4.5 | 3 | 55 |
| 14 | — | 300 | C 60 | 12 | — | 3 | 6 | 4.5 | 3 | 65 |
| 15 | 30 | 270 | C 75 | 12 | — | 3 | 4.5 | 4.5 | 3 | 65 |
| 16 | — | 300 | D 60 | 18 | — | 3 | 6 | 4.5 | 3 | 60 |
| 17 | — | 300 | D 75 | 18 | — | 3 | 6 | 4.5 | 3 | 60 |
| 18 | 30 | 270 | D 75 | 12 | — | 3 | 4.5 | 4.5 | 3 | 60 |
| 19 | — | 300 | E 45 | 9 | — | 3 | 6 | 4.5 | 3 | 55 |
| 20 | — | 300 | E 60 | 9 | — | 3 | 6 | 4.5 | 3 | 55 |
| 21 | — | 300 | E 75 | 9 | — | 1.5 | 6 | 4.5 | 3 | 55 |
| 22 | — | 300 | E 150 | 9 | — | 1.0 | 6 | 4.5 | 3 | 65 |
| 23 | — | 300 | F 60 | 9 | — | 1.0 | 6 | 4.5 | 3 | 60 |
| 24 | — | 300 | F 120 | 9 | — | 1.0 | 6 | 4.5 | 3 | 70 |
| 25 | — | 300 | G 60 | — | 6 | 3 | 4.5 | 4.5 | 3 | 55 |
| 26 | — | 300 | G 66 | — | 6 | 3 | 4.5 | 4.5 | 3 | 55 |
| 27 | — | 300 | G 75 | — | 6 | 3 | 4.5 | 4.5 | 3 | 55 |
| 28 | 30 | 270 | G 60 | — | 6 | 3 | 4.5 | 4.5 | 3 | 55 |
| 29 | 30 | 270 | G 66 | — | 6 | 3 | 4.5 | 4.5 | 3 | 55 |
| 30 | 30 | 270 | G 75 | — | 6 | 3 | 4.5 | 4.5 | 3 | 55 |
| 31 | — | 300 | G 60 | 9 | — | 3 | 4.5 | 4.5 | 3 | 55 |
| 32 | — | 300 | G 66 | 9 | — | 3 | 4.5 | 4.5 | 3 | 55 |
| 33 | — | 300 | G 75 | 9 | — | 3 | 4.5 | 4.5 | 3 | 55 |
| 34 | 30 | 270 | G 60 | 9 | — | 3 | 4.5 | 4.5 | 3 | 50 |
| 35 | 30 | 270 | G 66 | 9 | — | 3 | 4.5 | 4.5 | 3 | 50 |
| 36 | 30 | 270 | G 75 | 9 | — | 3 | 4.5 | 4.5 | 3 | 50 |

Table II

| Foam of Example | Density, pcf. | Compressive Strength at 10% Deflection, psi. | Tumbling Friability % Wt. Loss | Butler Chimney Test % Weight Retention | Flame Height in. | Time to SX sec. |
|---|---|---|---|---|---|---|
| 1 | 2.1 | 38 | 3 | 95 | 3 | 10 |
| 2 | 2.3 | 35 | 5 | 95 | 5 | 10 |
| 3 | 2.1 | 30 | 2 | 98 | 5 | 10 |
| 4 | 2.0 | 36 | 13 | 96 | 4 | 10 |
| 5 | 2.0 | 40 | 15 | 95 | 4 | 10 |
| 6 | 2.1 | 40 | 11 | 95 | 4 | 10 |
| 7 | 2.0 | 41 | 5 | 97 | 4 | 10 |
| 8 | 2.0 | 37 | 16 | 96 | 4 | 10 |

Table II-continued

| Foam of Example | Density, pcf. | Physical Properties of Foams | | Butler Chimney Test | | |
| --- | --- | --- | --- | --- | --- | --- |
| | | Compressive Strength at 10% Deflection, psi. | Tumbling Friability % Wt. Loss | % Weight Retention | Flame Height in. | Time to SX sec. |
| 9 | 2.1 | 31 | 3 | 95 | 4 | 10 |
| 10 | 2.2 | 32 | 11 | 92 | 9 | 10 |
| 11 | 2.4 | 34 | 9 | 91 | 10 | 10 |
| 12 | 2.4 | 26 | 8 | 85 | 10 | 10 |
| 13 | 2.3 | 26 | 14 | 93 | 7 | 10 |
| 14 | 2.1 | 27 | 12 | 92 | 7 | 10 |
| 15 | 1.9 | 19 | 12 | 90 | 8 | 10 |
| 16 | 2.1 | 24 | 19 | 93 | 8 | 10 |
| 17 | 2.2 | 29 | 18 | 92 | 10 | 10 |
| 18 | 2.0 | 22 | 17 | 93 | 7 | 10 |
| 19 | 2.1 | 30 | 8 | 96 | 3 | 10 |
| 20 | 2.1 | 38 | 5 | 95 | 4 | 10 |
| 21 | 2.2 | 36 | 5 | 94 | 5 | 10 |
| 22 | 2.1 | 24 | 1 | 88 | 10 | 11 |
| 23 | 2.0 | 21 | 31 | 90 | 6 | 10 |
| 24 | 2.1 | 17 | 10 | 89 | 9 | 10 |
| 25 | 1.8 | 27 | 13 | 97 | 4 | 10 |
| 26 | 1.8 | 28 | 9 | 95 | 5 | 10 |
| 27 | 1.9 | 28 | 10 | 94 | 5 | 10 |
| 28 | 1.7 | 22 | 16 | 95 | 5 | 10 |
| 29 | 1.8 | 25 | 12 | 92 | 5 | 10 |
| 30 | 1.9 | 32 | 10 | 94 | 6 | 10 |
| 31 | 2.0 | 28 | 16 | 92 | 5 | 10 |
| 32 | 1.9 | 24 | 10 | 96 | 5 | 10 |
| 33 | 2.0 | 34 | 7 | 94 | 6 | 11 |
| 34 | 1.9 | 31 | 12 | 95 | 5 | 10 |
| 35 | 2.0 | 30 | 11 | 92 | 6 | 10 |
| 36 | 2.1 | 38 | 9 | 93 | 6 | 10 |

EXAMPLES 37-46

A series of foams was prepared following the procedure described in connection with the previous examples employing different urethane catalysts. In addition to the ingredients and amounts thereof presented in Table III, below, all formulations contained 300 parts of PAPI, 55 parts of FREON 11B, 9 parts of FA, 6 parts of TDH, 4.5 parts of FYROL CEF and 3 parts of DC-193. The physical properties of foams obtained thereof are presented in Table IV. In addition to the abbreviations referred to in connection with Table I, above, the following new abbreviations are employed in Table III:

DBTDL — dibutyltin dilaurate
SnOc — stannous octoate
PbOc — lead octoate
Polyol H — ethylene oxide capped propylene oxide adduct of glycerine having an equivalent weight of 341 and an ethylene oxide content of approximately 33% by weight Table III

| Example | Polyol | Foam Preparation Parts by Weight | | | |
| --- | --- | --- | --- | --- | --- |
| | | DBTDA | DBTDL | SnOc | PbOc |
| 37 | H 60 | 3 | — | — | — |
| 38 | H 66 | 3 | — | — | — |
| 39 | H 75 | 3 | — | — | — |
| 40 | H 60 | — | 3 | — | — |
| 41 | H 66 | — | 3 | — | — |
| 42 | H 75 | — | 3 | — | — |
| 43 | A 60 | — | — | 3 | — |
| 44 | E 60 | — | — | 3 | — |
| 45 | A 60 | — | — | — | 3 |
| 46 | E 60 | — | — | — | 3 |

Table IV

| Foam of Example | Density, pcf. | Physical Properties of Foams | | Butler Chimney Test | | |
| --- | --- | --- | --- | --- | --- | --- |
| | | Compressive Strength at 10% Deflection, psi. | Tumbling Friability % Wt. Loss | % Weight Retention | Flame height in. | Time to SX sec. |
| 37 | 2.0 | 20 | 12 | 93 | 7 | 10 |
| 38 | 1.9 | 19 | 19 | 93 | 7 | 10 |
| 39 | 1.9 | 20 | 14 | 93 | 7 | 10 |
| 40 | 2.1 | 25 | 26 | 93 | 7 | 10 |
| 41 | 2.1 | 23 | 30 | 94 | 6 | 10 |
| 42 | 2.1 | 25 | 27 | 92 | 7 | 10 |
| 43 | 2.2 | 23 | 13 | 92 | 8 | 11 |
| 44 | 2.0 | 21 | 10 | 93 | 6 | 10 |
| 45 | 2.1 | 16 | 18 | 91 | 8 | 10 |
| 46 | 2.0 | 16 | 15 | 92 | 7 | 10 |

EXAMPLE 47

Two series of foams were prepared following the procedure described in connection with the previous examples. The sole difference in the series was in the use of the polyol. In one series, the polyol employed was an ethylene oxide capped propylene oxide adduct of glycerine having an equivalent weight of 534, and an ethylene oxide content of 65% by weight (Polyol I). In the other series, the polyol employed was the propylene oxide adduct of glycerine having an equivalent weight of 510 (Polyol J). In addition to the ingredients and amounts thereof presented in Table V, below, all formulations contained 9 parts of FA, 6 parts of TDH, 3 parts of DBTDA, 4.5 parts of FYROL CEF, and 3 parts of DC-193.

As the data in the Table illustrate, the use of the primary hydroxy-terminated polyol resulted in foams of improved friability, compressive strength and flame retardancy, as compared to foams prepared from a conventional secondary hydroxy-terminated polyol of similar equivalent weight.

Table V

| Isocyanate PAPI | TDI | Polyol I | Polyol J | F-11B | Den., pcf. | Comp. Str. 10% Def., psi. | Tumb. Friab. % Wt. Loss | Butler Chimney Test % Wt. Ret. | Flame Ht. in. | Time to SX sec. |
|---|---|---|---|---|---|---|---|---|---|---|
| 300 | 0 | — | 60 | 60 | 1.9 | 19 | 16 | 94 | 5 | 10 |
| 300 | 0 | — | 66 | 60 | 2.0 | 20 | 16 | 93 | 7 | 10 |
| 300 | 0 | — | 75 | 60 | 2.0 | 18 | 12 | 93 | 6 | 10 |
| 300 | 0 | 60 | — | 55 | 2.2 | 55 | 9 | 97 | 4 | 10 |
| 300 | 0 | 66 | — | 55 | 2.2 | 40 | 6 | 95 | 6 | 10 |
| 300 | 0 | 75 | — | 55 | 2.3 | 42 | 6 | 94 | 5 | 10 |
| 270 | 30 | — | 60 | 55 | 2.0 | 22 | 16 | 95 | 7 | 10 |
| 270 | 30 | — | 66 | 55 | 1.9 | 18 | 16 | 95 | 6 | 10 |
| 270 | 30 | — | 75 | 55 | 1.9 | 19 | 14 | 93 | 6 | 10 |
| 270 | 30 | 60 | — | 55 | 2.0 | 43 | 12 | 94 | 5 | 10 |
| 270 | 30 | 66 | — | 55 | 2.0 | 33 | 11 | 95 | 5 | 10 |
| 270 | 30 | 75 | — | 55 | 2.1 | 36 | 8 | 94 | 6 | 10 |

The embodiments of the invention in which an exclusive property or priviledge is claimed are defined as follows:

1. A cellular foam composition characterized by carbodiimide, isocyanurate and urethane linkages prepared by condensing an organic polyisocyanate in the presence of a blowing agent, from 0.01 to 0. equivalent per equivalent of isocyanate of a primary hydroxy-terminated polyoxyalkylene or polyester polyol having an average functionality of from two to eight and an average equivalent weight of from about 150 to 1500 and a catalytically sufficient amount of a catalyst system consisting essentially of (a) from 0.1 part to 10 parts of methanol per 100 parts of organic polyisocyanate, (b) a tertiary amine trimerization catalyst, and (c) a urethane catalyst.

2. The composition of claim 1 wherein the polyol is an ethylene oxide adduct of an aliphatic alcohol having from two to eight hydroxyl groups.

3. The composition of claim 1 wherein the polyol is an ethylene oxide adduct of a propylene oxide adduct of an aliphatic alcohol having from two to eight hydroxyl groups.

4. The composition of claim 1 wherein the polyol is an ethylene oxide adduct of 2,2-bis(4-hydroxyphenyl) propane.

5. The composition of claim 1 wherein the tertiary amine trimerization catalyst is 1,3,5-tris(N,N-dimethylaminopropyl)-s-hexahydrotriazine.

6. The composition of claim 1 wherein the urethane catalyst is dobutyltin diacetate.

7. The composition of claim 1 wherein the blowing agent is a fluorocarbon.

* * * * *

UNITED STATES PATENT AND TRADEMARK OFFICE
CERTIFICATE OF CORRECTION

PATENT NO. : 4,029,610
DATED : June 14, 1977
INVENTOR(S) : Thirumurti L. Narayan and Moses Cenker It is certified that error appears in the above-identified patent and that said Letters Patent are hereby corrected as shown below:

Column 11, line 25, "to 0. equivalent" should read -- to 0.5 equivalent-- .

Column 12, line 31, "dobutyltin" should read --dibutyltin-- .

Signed and Sealed this twenty-third Day of August 1977

[SEAL]

Attest:

RUTH C. MASON
*Attesting Officer*

C. MARSHALL DANN
*Commissioner of Patents and Trademarks*